United States Patent [19]

Kawata

[11] Patent Number: 5,166,808
[45] Date of Patent: Nov. 24, 1992

[54] DIGITAL BINARIZATION CIRCUIT FOR CONVERSION OF IMAGE DATA

[75] Inventor: Toshiyuki Kawata, Hyogo, Japan
[73] Assignee: Mitsubishi Denki Kabushiki Kaisha, Tokyo, Japan
[21] Appl. No.: 437,195
[22] Filed: Nov. 16, 1989

[30] Foreign Application Priority Data

Dec. 5, 1988 [JP] Japan .................. 63-307303

[51] Int. Cl.$^5$ .............................................. H04N 1/40
[52] U.S. Cl. .................... 358/443; 358/464; 358/466
[58] Field of Search .............. 358/462, 464, 465, 466, 358/443, 445, 448, 456; 382/50, 54

[56] References Cited

U.S. PATENT DOCUMENTS 4,812,667 3/1989 Kobayashi et al. ................ 358/464
4,931,881 6/1990 Matsui et al. ...................... 358/464

FOREIGN PATENT DOCUMENTS 0052187 5/1982 European Pat. Off. .
0118905 9/1984 European Pat. Off. .
0160363 11/1985 European Pat. Off. .
0220069 4/1987 European Pat. Off. .
60-191563 9/1985 Japan ............................. 358/466
8807798 10/1988 PCT Int'l Appl. .
2135852 9/1984 United Kingdom .

OTHER PUBLICATIONS

European Search Report, Mar. 9, 1990.

*Primary Examiner*—Edward L. Coles, Sr.
*Assistant Examiner*—Thomas D. Lee
*Attorney, Agent, or Firm*—Rothwell, Figg, Ernst & Kurz

[57] ABSTRACT

A digital binarization circuit for image data includes a background level detecting circuit which uses a video signal as a reference input for determining the background level of an image represented by the video signal, and outputs the background level as a first address signal. A character level detecting circuit compares the video signal with a character level in a load decision comparator and loads the video signal as a character level when the signal is less than the reference level, and outputs the character level as a second address signal. A memory circuit ouputs a threshold value stored at an address designated by the first and second address signals to a comparator. The optimum threshold value is outputted among prescribed threshold values stored in the memory circuit. The comparator compares the digitized video signal with the optimum threshold value and outputs a binary signal corresponding to the comparison result. Even for original documents with a dark background, noise is not liable to occur in the transmitted video signal, and a light character can appear clearly on the transmitted video signal.

7 Claims, 5 Drawing Sheets

DIGITAL BINARIZATION CIRCUIT FOR CONVERSION OF IMAGE DATA

BACKGROUND OF THE INVENTION

1. Field of the Invention

The present invention relates to a digital binarization circuit for converting image data from an image sensor in a facsimile apparatus or the like into digital binary numbers.

2. Description of the Prior Art

FIG. 1 is a block diagram illustrating a digital binarization circuit for image data in fixed slice system in the prior art. In FIG. 1, numeral 1 designates an image sensor which reads an image and produces an analog signal representative thereof, numeral 2 designates an analog to digital video signal processor which converts the analog signal from the image sensor 1 into a digital signal of n bits per pixel unit, numeral 3 designates a density changing circuit which outputs a changing signal of m bits so as to vary a threshold level, numeral 4 designates a threshold generator which generates a threshold value of n bits based on the changing signal of m bits outputted from the density changing circuit 3, and numeral 5 designates an n bit comparator which compares the n bit video signal from the video signal processor 2 with the threshold value of n bits and outputs a binary signal corresponding to the result of the comparison.

FIG. 2 illustrates a circuit arrangement of density changing circuit 3 and threshold generator 4. An m-bit signal representing the density of the entire document is developed by circuit 3 via a plurality of switches (electronic or the like), and is inputted to generator 4 which develops an n-bit threshold signal in response to the m-bit input signal. The threshold generator is constituted by a plurality of nodes selectively grounded or connected to a voltage source as conventionally known. In the figure, the first and second bits are fixed at "1", the n-1$^{th}$ and n$^{th}$ bits are fixed at "0", and the remaining bits are varied in response to the m-bit signal.

Next, operation will be described. An image read by the image sensor 1 is represented as an output analog signal having voltage levels corresponding to density of the picture image and is inputted to the video signal processor 2. The analog signal is subjected to signal processing such as sample/hold, A-D conversion or the like in the video signal processor 2 and converted into digital numbers of n bits per pixel.

The digital value of n bits and the threshold value of n bits from threshold generator 4 are inputted respectively to the comparator 5 and compared in value. As a result of the comparison, if the digital value of the n bits of the video signal is larger, the comparator 5 outputs H level, and if not it outputs L level. Thus, image data above the threshold level is stored as a binary number, while image data below the threshold level is stored as a zero level.

Since the digital binarization circuit of image data in the prior art is formed as above described, the operator must vary the switch setting of the threshold value to correspond to the original document If the setting is not suitable, when part of the document except for characters or the like (the background of the original document) is dark, noise may be superposed on the transmitted video signal, and when the characters in the original document are light, the characters do not appear clearly. Also under such special conditions of the original document such that differences of density of the background exist or that the dark parts and the light parts are mixed in a character, setting of the optimum threshold value is difficult.

SUMMARY OF THE INVENTION

An object of the invention is to provide a digital binarization circuit for image data which detects the background level and the character level in an original document simultaneously, and sets the optimum threshold value corresponding to each part in the original document based on these levels.

Another object of the invention is to provide a digital binarization circuit for image data which sets the optimum threshold value to enable picture image formation having a suitable contrast ratio between the background portion and the character portion even when the contrast ratio is small in the original document, for example, when the background portion is dark or the character portion is light.

Still another object of the invention is to provide a digital binarization circuit for image data which sets the optimum threshold value to enable picture image formation of high quality having no difference of density in the background or the characters even when a difference in density of the background exists in the same original document or dark portions and light portions are mixed in the character.

The foregoing and other objects an novel features of the invention will be more fully apparent from the following detailed description read in connection with the accompanying drawings. It is to be understood, however, that the drawings are for purposes of illustration only and are not intended as a definition of the limits of the invention.

In order to attain the above objects, a digital binarization circuit for image data according to the invention comprises a background level detecting circuit which uses the video signal as a clock selecting reference input and selects either of a first up clock for counting up and a down clock for counting down, and uses the outputted count clock signal as a clock input and outputs a plurality of upper counting output bits as a first address signal; a character level detecting circuit which uses the video signal as a load decision input and loads the digital value if the load decision input meets the prescribed decision condition, and uses a second up clock as a clock input and counts the clock input and outputs the plurality of upper counting output bits as a second address signal; and a memory circuit which combines the first address signal and the second address signal as an address assigning signal, and outputs data of the address assigned by the address assigning signal as a threshold value to a comparator.

The memory circuit in the invention stores prescribed threshold values for all addresses to be assigned by the address assigning signal, and outputs the optimum threshold value corresponding to outputs of the background level detecting circuit and the character level detecting circuit.

DETAILED DESCRIPTION OF THE PREFERRED EMBODIMENTS

Preferred embodiments of the invention will now be described in detail referring to the accompanying drawings.

Figure 1:
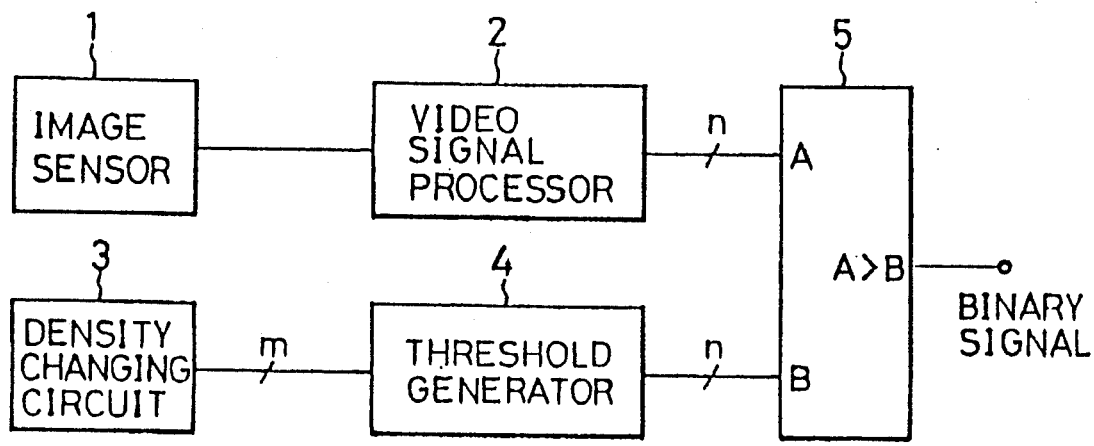
FIG. 1 is a block diagram illustrating a digital binarization circuit for image data in the prior art.
Figure 2:
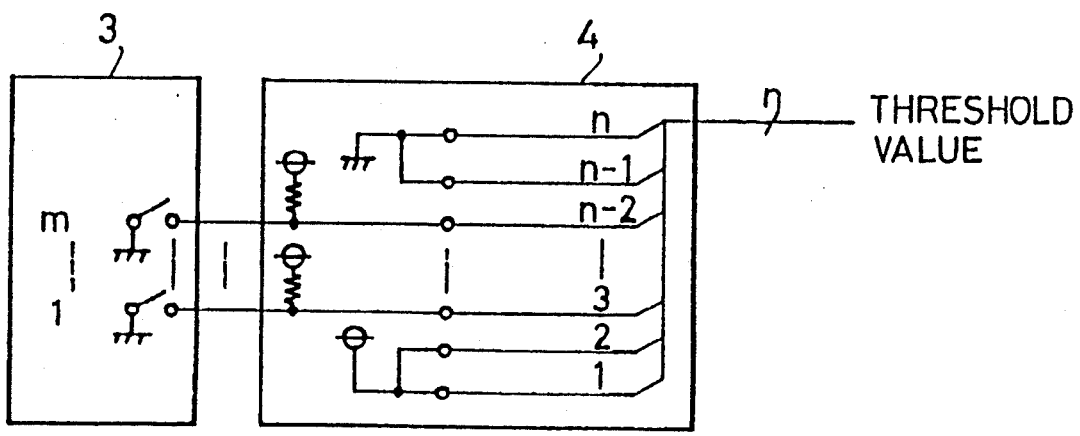
FIG. 2 is a circuit diagram illustrating a density changing circuit and a threshold generator shown in FIG. 11.
Figure 3:
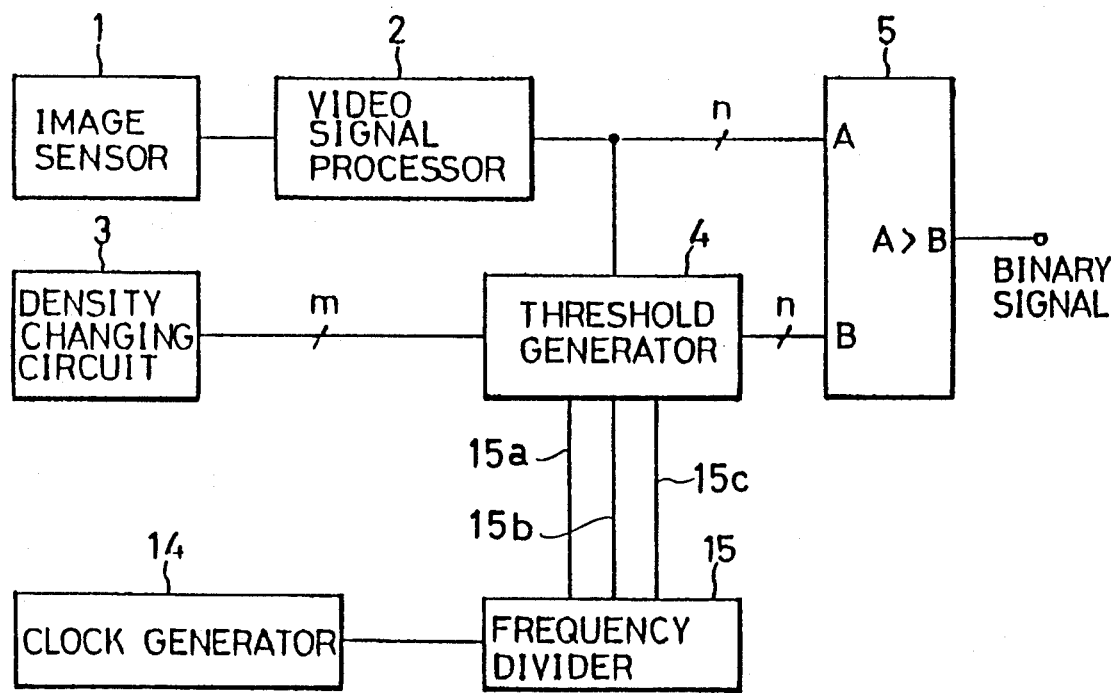
FIG. 3 is a block diagram illustrating a digital binarization circuit for image data according to one embodiment of the invention.

FIG. 3 is a block diagram illustrating a digital binarization circuit for image data according to one embodiment of the invention. The digital binarization circuit in FIG. 3 is different from that shown in FIG. 1 in that the output of the video signal processor 2, i.e., a video signal converted into a digital number of n bits is supplied also to a threshold generator 4.

Figure 4:
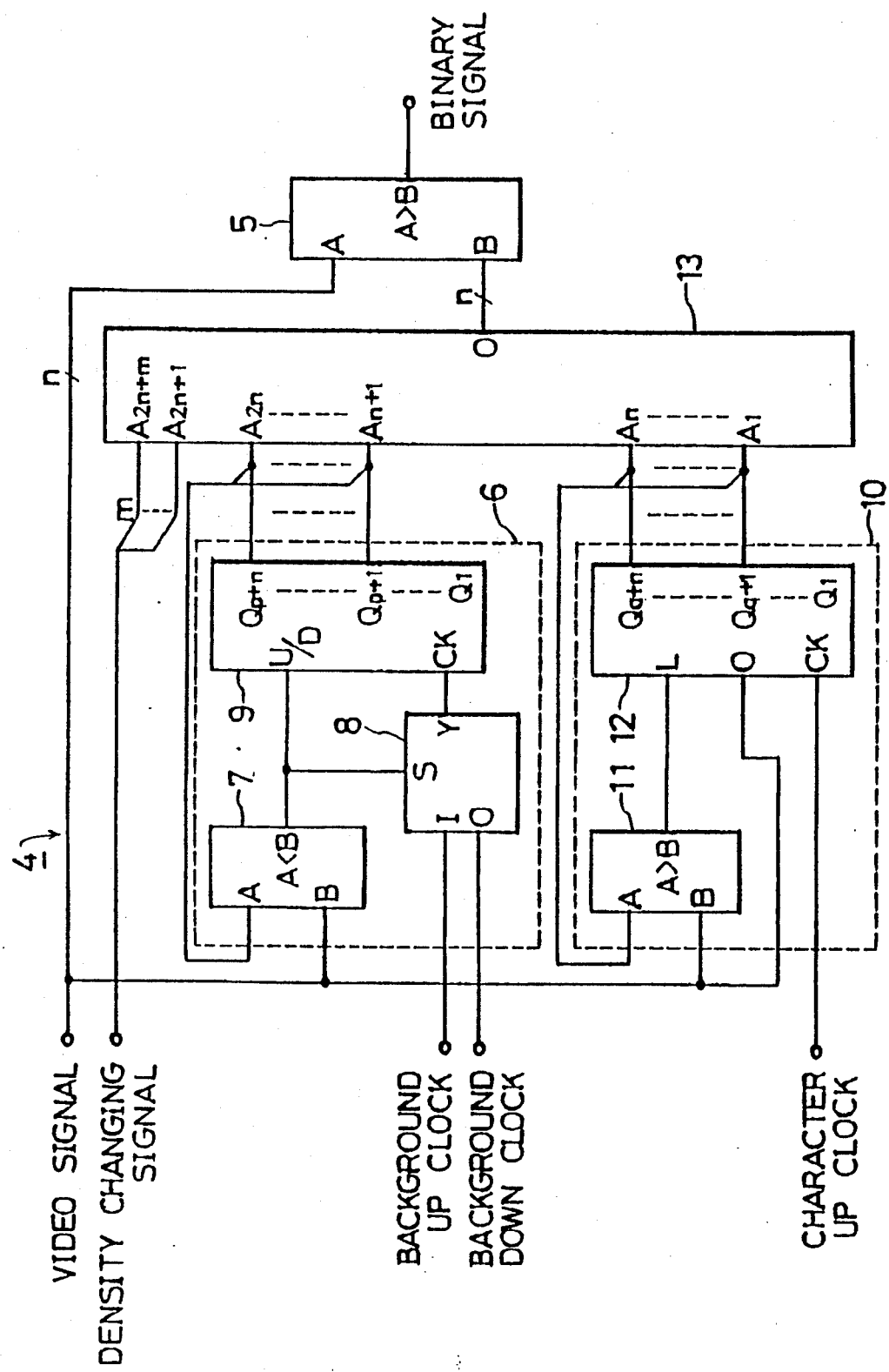
FIG. 4 is a circuit diagram illustrating a threshold generator shown in FIG. 3.

FIG. 4 is a circuit diagram of a threshold generator which combines a background level detecting circuit, a character level detecting circuit and a memory circuit together in accordance with one embodiment of the invention. In FIG. 4, the same reference numerals as those already described designate the same parts and the description thereof will be omitted. Numeral 6 designates a background level detecting circuit which is composed of an up/down selecting comparator 7 having the video signal as a selection reference input B. An output signal constituting the upper n bits of an up/down counter 9 is applied to comparator 7 as an input A which is compared with the input B. A selector 8 selects and outputs either a background up clock or a background down clock in accordance with output of the up/down selecting comparator 7, and up/down counter 9 of (n + p) bits determines whether count up or count down should be made in accordance with the output of the up/down selecting comparator 7 and counts an output clock of the selector 8 as an input clock at input CK. Numeral 10 designates a character level detecting circuit which is composed of a load decision comparator 11 having the video signal as one input B and an output signal of the upper n bits of a preset counter 12 as another input A which is compared with the input B. Preset counter 12 of (n +Q) bits having a load input terminal (L terminal) for receiving the output signal from comparator 11 and an input terminal 0 for loading the upper n bits of the video signal in accordance with the output of the load decision comparator 11 and counting a character up clock as an input clock. Numeral 13 designates a ROM being a memory circuit receiving a density changing signal of m bits and an upper n-bit output signal of the up/down counter a as a first address signal and receiving an output signal of the upper n bits of the preset counter 12 as a second address signal. The first and second address signals constitute address assigning signals $A_1 - A_{2n}$ and cause data stored at the assigned address in ROM 13 to be outputted as a threshold value. Referring to FIG. 3, numeral 14 designates a clock generator, and numeral 15 designates a frequency divider connected to the output of the clock generator and to the threshold generator 4.

Next, operation will be described. In a manner similar to the prior art, the image is read by the image sensor 1 and is converted by the video signal processor 2 into a digital video signal of n bits per pixel. In this case, the darker portions of the picture image correspond to smaller digital values indicated in the n-bit signal. That is, a completely black portion is represented by all zeroes and a completely white portion is represented by all ones. The threshold value for the binarization of the video signal is outputted from the threshold generator 4. In this case, a density changing signal of m bits is outputted from the density changing circuit 3, and constitutes the upper m bits $A_{2n+1} - A_{2n+m}$ of the address assigning signal to the ROM 13. Data in the ROM 13 at the address indicated by the (2n + m) bits is outputted to the comparator 5 as an n-bit threshold level.

First, operation of the background level detecting circuit 6 will be described. A clock signal from the clock generator 14 is divided in frequency through the frequency divider 15, and then inputted to the background level detecting circuit 6 as a background up clock 15a contributing to raise the detecting output of the background level detecting circuit 6 and a background down clock 15b contributing to lower the output of circuit 6. The video signal of n bits and the output signal of the upper n bits of the up/down counter 9 are respectively inputted as the B input and A input of the up/down selecting comparator 7. If the B input is larger than the A input (the picture image being brighter relative to the background level detecting signal), the up/down selecting comparator 7 supplies up level to the S terminal and the U/D terminal so that the selector 8 outputs a background up clock and the up/down counter 9 counts up to raise the background reference value. On the contrary, if the B input is not larger than the A input (the image being darker than the background reference level), according to the function of the up/down selecting comparator 7, the up/down counter 9 acts as a down counter to lower the background level reference value. Thus, the up/down counter 9 outputs a signal following the level of the video signal as a background level. The up/down counter 9 is constituted by counters of (n +p) bits, and outputs the upper n bits as background level. This is because the lower p bits are used for frequency dividing of the up/down clock which has a frequency higher than the maximum varying speed of the background level detecting signal which is an n-bit signal, and thereby fine control is performed. That is, if $2^p$ clock pulses are inputted to the up/down counter 9, a counter constituted by the upper n bits is varied by 1. Even if the B input is varied in state of clocks less than $2^p$, the up/down changing can be performed immediately. Consequently, the background level detecting signal for an original document having special conditions becomes suitable when the up/down counter 9 is constituted by n bits.

Next, operation of the character level detecting circuit 10 will be described. A clock signal from the clock generator 14 is divided in frequency through the frequency divider 15, and then inputted to the character level detecting circuit 10 as a character up clock 15c. The video signal of n bits and the output signal of the upper n bits of the preset counter 12 are respectively inputted as B input and A input to the load decision comparator 11. If the B input is smaller than the A input (corresponding to the picture image being darker than the character level), the load decision comparator 11 generates an active output to the L terminal of the preset counter 12 which in response loads the n-bit video signal as the upper n bits of the preset counter 12. On the contrary, if the B input is not smaller than the A input (the image being brighter than the character level), the load decision comparator 11 generates a nonactive output to the L terminal and enables the preset counter 12 to count up. The up count of the preset counter 12 is continued until the state that B input < A input. Thus the preset counter 12 outputs a signal following the level of the video signal as a character level. The preset counter 12 is constituted by counters of (n + q) bits in similar manner to the up/down counter 9, and outputs the upper n bits as character level. The lower q bits are used for frequency dividing the up clock of higher frequency than the maximum varying speed of the character level detecting signal in the upper n bits, thereby fine control is performed. That is, even if the B input is varied in inputted state of clocks less than $2^q$, control to the L terminal can be performed immediately. Consequently, the changing can be performed so that the video signal is immediately loaded when darker than the current character level to immediately bring the character level down, or otherwise the up count is started to incrementally increase the character level.

On the other hand, in the ROM 13, the optimum threshold values of n bits are stored as data from an address assigned by $A_1 - A_{2n+m} = 0, \ldots, 0$ to an address assigned by $A_1 - A_{2n+m} = 1, \ldots, 1$ corresponding to each combined pattern of the density changing signal, the background level detecting signal and the character level detecting signal.

Method of estimating the data to be stored in the ROM 13 will be described based on FIG. 5.

Figure 5:
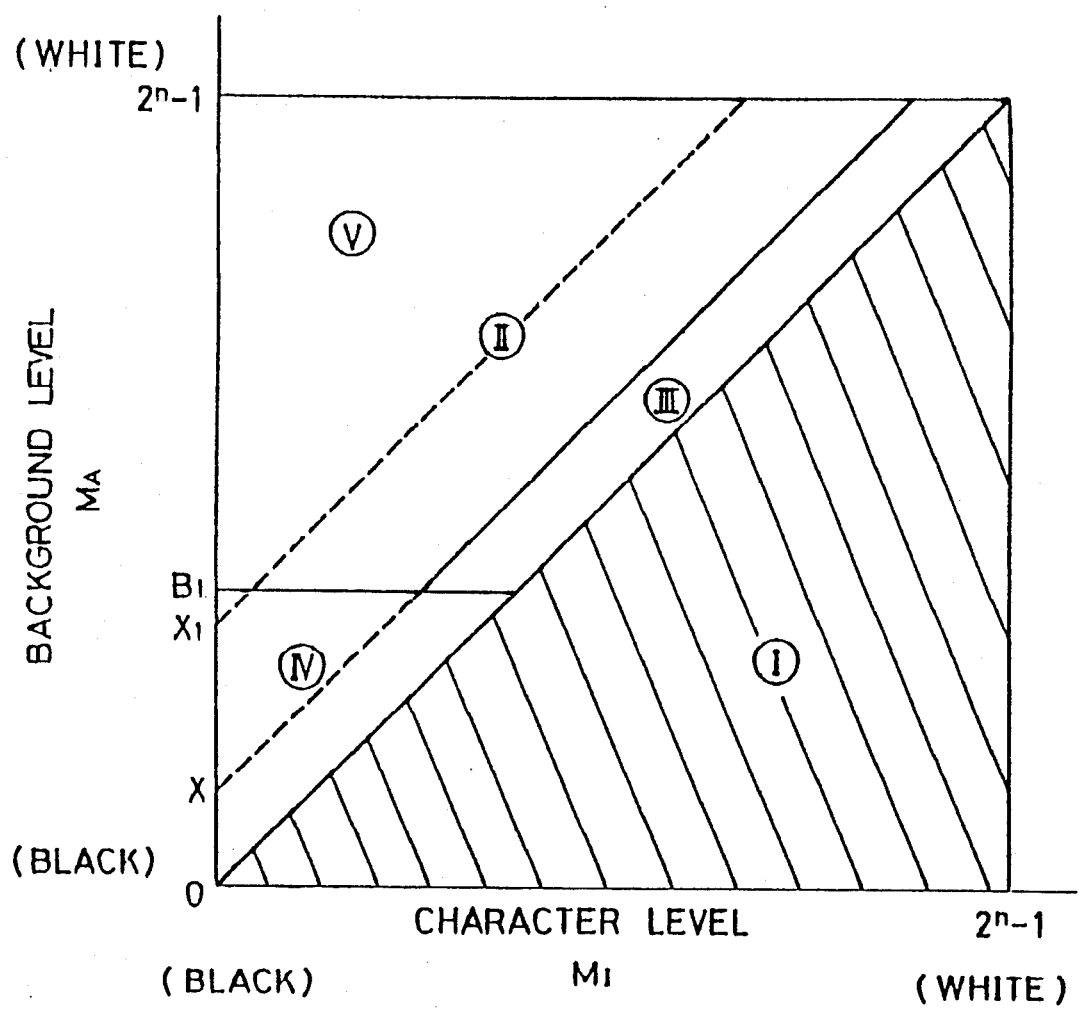
FIG. 5 is a diagram illustrating a threshold setting area according to the invention.

FIG. 5 is a diagram illustrating a threshold setting area. In FIG. 5, $M_A$ represents background level and $M_I$ represents character level. The background level $M_A$ is in n bits and corresponds to the ordinate, and the character level $M_I$ is in n bits and corresponds to the abscissa. Each level of n bits has the density steps that if black is made zero, white becomes $(2^n - 1)$, and the threshold value at the intersection between the background level $M_A$ and the character level $M_I$ is the optimum threshold value accessed.

In the background level $M_A$ and the character level $M_I$ obtained in the above-mentioned operation content, since the contrast ratio between the background and the 25 character can never be less than 1, the relationship always exists that $M_A \geqq M_I$ Consequently, the hatched area I in FIG. 5 becomes unnecessary and is not used.

If D is made a threshold value, the threshold value D is estimated by the following formula (1).

$D = K \times M_A + (1-K) \times M_I$ (1)

wherein K : ratio of threshold value (K ≦ 1) The threshold value D estimated by formula (1) is addressed in the triangular area II surrounded by $M_A = M_I$, $M_I = 0$ and $M_A = 2^n - 1$.

The ratio K of the threshold value is varied in $2^n$ steps by the density changing signal of m bits, thereby $2^n$ threshold values can be set. Consequently, the density can be changed freely by operation of the user. However, memory areas of $2^n$ locations shown in FIG. 5 are required, of course, for the density changing.

On the other hand, from the viewpoint of outputting the optimum threshold value, when the background level $M_A$ and the character level $M_I$ are comparable, the difference between the outputted threshold value D and the background level $M_A$ may become too small and therefore noise may appear in the background part of the produced picture image signal. Consequently, in the embodiment of the invention, in order to prevent threshold value D from getting too close to the background level, the following limiting conditions have been set.

If X is made the minimum value of difference between the background level without producing the above-mentioned noise and the threshold value, when difference between the background level $M_A$ and the threshold value D is X or less, i.e., when $M_A - D \leqq X$ the threshold value D is substituted by $D_1 = M_A - X$ thereby the substituted threshold value $D_1$ does not produce the background noise. This means in FIG. 5 that when the accessed threshold value D is included in the area III surrounded by linear expressions $M_A = M_I$, $M_A = M_I + X$ and $M_A = 2^n - 1$, the threshold value $D_1$ is selected. That is, the area III is not used. The above-mentioned value X is estimated by experiment.

Also, when the background level $M_A$ is less than a prescribed level $B_1$, for example, when the original document is wholly black, since the wholly black state cannot be reproduced by the above-mentioned formula, in the embodiment of the invention, the threshold value D in this state is made $D = D_B \approx B_1$ so as to reproduce the wholly black state. This means in FIG. 5 that when the accessed threshold value D is included in the area IV surrounded by linear expressions of $M_A = M_I$, $M_I = 0$ and $M_A = B_1$, the threshold value $D_B$ in this state is made equivalent to the background level $B_1$ and the wholly black state is reproduced.

Moreover, in the case of the original document where difference between the background level $M_A$ and the character level $M_I$ is relatively large, the minimum value X of difference between the background level $M_A$ and the threshold value D is taken as large as $X_1$ shown in FIG. 5, and the area V surrounded by linear expressions of $M_A = M_I + X$ and $M_I = 0$ and $M_A = 2^n - 1$ can be defined and applied. Consequently, the threshold value to reproduce the picture image being always clear with excellent picture quality can be outputted.

Data assigned the addresses by combined pattern of $A_1 - A_{2n+m}$ is outputted thereby the optimum threshold value of n bits is outputted. The threshold value of n bits and the video signal indicated by n bits are inputted to the comparator 5, and compared in amount as binary number.

In the embodiment, since the density changing signal is inputted as the upper m bits of the address, position of the rough threshold value is determined by the switch changing and the fine position in the roughly divided area is determined by the threshold generator 4. However, when the original document as the object can be controlled well, only the function of the threshold generator 4 is needed and the density changing signal is unnecessary.

Figure 6:
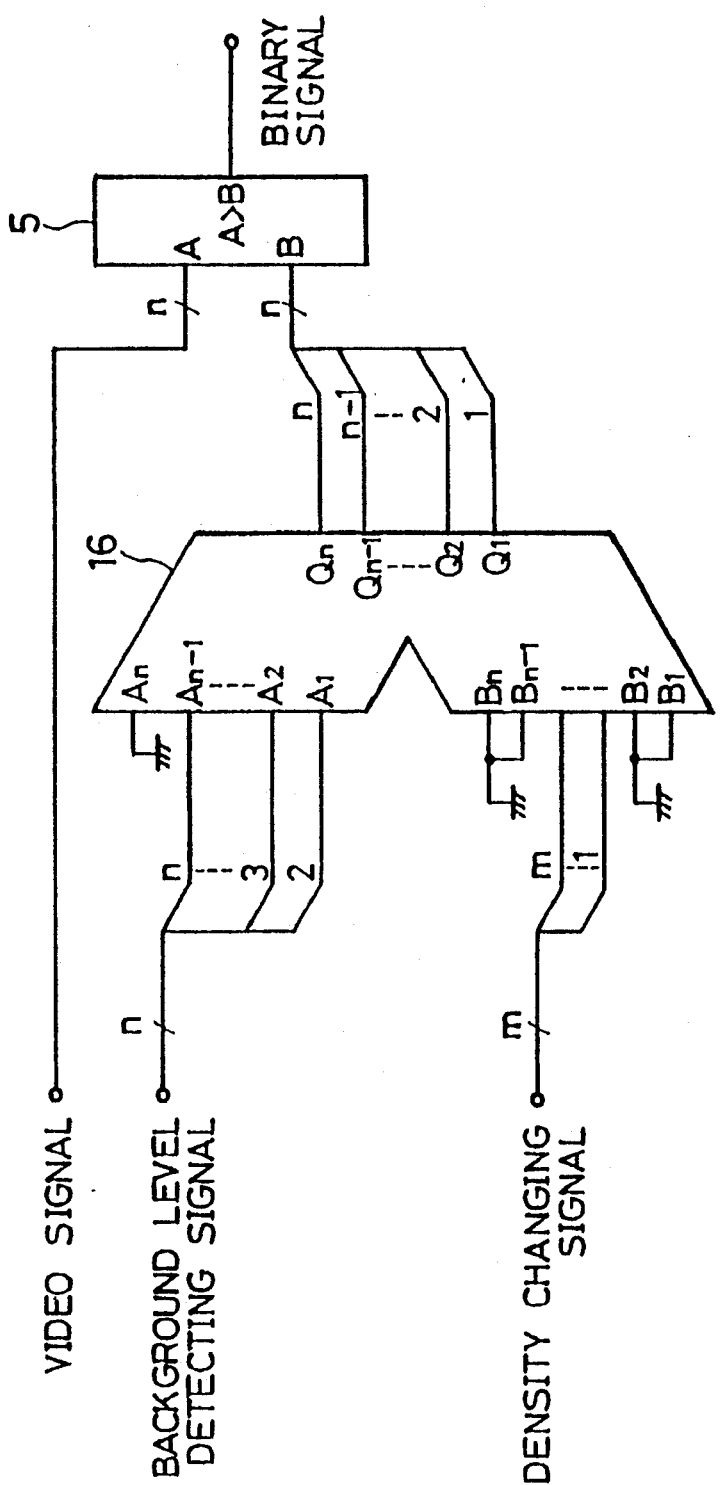
FIG. 6 is a circuit diagram illustrating a threshold generator as another embodiment of the invention.

Also in the embodiment, although the threshold generator 4 is provided with the ROM 13 for generating the threshold value, the threshold generator 4 may be provided with an adder 16 of n bits as shown in FIG. 6. In this case, the character level detecting circuit 10 becomes unnecessary. A circuit diagram according to this embodiment is shown in FIG. 6. The background level detecting circuit 6 and the density changing circuit 3 are similar to those shown in the preceding embodiment, and the background level detecting signal of n bits and the density changing signal of m bits are inputted to the n-bit adder 16 as shown in FIG. 6. In this case, the 2nd through nth bits of the n-bit background level detecting signal are used, and inputted to the adder at the 1st - (n-1)th bit of the A input. In shifting by one bit, (background level)/2 is inputted to the adder 16. Also, the density changing signal of m bits is connected to prescribed bits of the B input of the adder 16 so that any value to be added can be obtained. According to the above description, from the adder 16, the output of n bits represented by

[(background level)/2] +α can be obtained, and this becomes the slice level as it is. Since the threshold value following the background level can be obtained, similar effect to the case of using the ROM 13 for generating the threshold value can be obtained. In addition, signal processing by the comparator 5 is similar to that of the preceding embodiment.

As above described, according to the invention, the binary circuit for image data is provided with a background level detecting circuit for generating an output following the video signal and a character level detecting circuit, and output signals of these circuits are made address assigning signals to access a threshold value. Moreover, the frequency of the drive clock signal of the background level detecting circuit and the character level detecting circuit is made higher than the output varying speed, thereby the optimum threshold value can be automatically set. Even for a special original document, the optimum threshold value can be set in each part of the original document, and even in the original document with the dark background, noise is not liable to appear in the transmitted video signal and also a light character can be seen clearly in the transmitted video signal.

What is claimed is:

1. A digital binarization circuit, wherein an analog image signal representing an image is converted into a digital image signal of n-bits per pixel, n being an integer, comprising:
    background level detecting means for generating a background level signal corresponding to the background level of said image;
    character level detecting means for detecting the level of a character in said image and generating a character level signal corresponding thereto;
    memory means storing a set of predetermined threshold values and responsive to said background and character level signals as first and second address signals for outputting a particular threshold value stored at an address corresponding to said address signals; and
    comparator means for comparing said digital image signal with said outputted threshold value and outputting a high level signal when said digital image signal is greater than said outputted threshold value, and a low level signal when said digital image signal is less than said threshold value.

2. A digital binarization circuit according to claim 1, wherein said background level detecting means comprises:
    an up/down counter for outputting said background level signal;
    an up/down selecting comparator having one input coupled to receive said background level signal, another input coupled to receive said digital image signal, and a selector output coupled to an up/down input of said counter for selecting a count up state of said counter when said digital image signal is greater than said background level signal and a count down state otherwise; and
    a selector coupled to the output of said selecting comparator for selecting a background up clock as a clock input to said counter in said count up state and a background down clock as a clock input to said counter in said count down state.

3. A digital binarization circuit according to claim 1, wherein said character level detecting means comprises:
    a preset counter for outputting said character level signal; and
    a load decision comparator having one input coupled to receive said character level signal, another input coupled to receive said digital image signal, and an output coupled to a load input of said preset counter for instructing said counter to load said digital image signal as said character level signal when said digital image signal is less than the character level signal inputted to said comparator, and instructing said counter to count up when said digital image signal is greater than said inputted character level signal.

4. A digital binarization circuit, wherein an analog image signal representing an image is converted into a digital image signal of n-bits per pixel, n being an integer, comprising:
    background level detecting means for generating a background level signal corresponding to the background level of said image;
    density changing means for outputting a density changing signal for varying a threshold value to which said digital image signal is compared;
    an adder which adds said background level signal and said density changing signal to form an n-bit signal corresponding to said threshold value at an output thereof; and
    comparator means for comparing said digital image signal with said outputted threshold value and outputting a high level signal when said digital image signal is greater than said outputted threshold value, and a low level signal when said digital image signal is less than said threshold value.

5. A digital binarization circuit according to claim 4, wherein said background level detecting means comprises:
    an up/down counter for outputting said background level signal;
    an up/down selecting comparator having one input coupled to receive said background level signal, another input coupled to receive said digital image signal, and a selector output coupled to an up/down input of said counter for selecting a count up state of said counter when said digital image signal is greater than said background level signal and a count down state otherwise; and a selector coupled to the output of said selecting comparator for selecting a background up clock as a clock input to said counter in said count up state and a background down clock as a clock input to said counter in said count down state.

6. A digital binarization circuit, wherein an analog image signal representing an image is converted into a digital image signal of n-bits per pixel, n being an integer, comprising:

background level detecting means for generating a background level signal corresponding to the background level of said image, including
 an up/down counter for outputting said background level signal,
 an up/down selecting comparator having one input coupled to receive said background level signal, another input coupled to receive said digital image signal, and a selector output coupled to an up/down input of said counter for selecting a count up state of said counter when said digital image signal is greater than said background level signal and a count down state otherwise, and
 a selector coupled to the output of said selecting comparator for selecting a background up clock as a clock input to said counter in said count up state and a background down clock as a clock input to said counter in said count down state;

character level detecting means for detecting the level of a character in said image and generating a character level signal corresponding thereto;

memory means storing a set of predetermined threshold values and responsive to said background and character level signals as first and second address signals for outputting a particular threshold value stored at an address corresponding to said address signals; and comparator means for comparing said digital image signal with said outputted threshold value and outputting a high level signal when said digital image signal is greater than said outputted threshold value, and a low level signal when said digital image signal is less than said threshold value.

7. A digital binarization circuit according to claim 6, wherein said character level detecting means comprises:

a preset counter for outputting said character level signal; and a load decision comparator having one input coupled to receive said character level signal, another input coupled to receive said digital image signal, and an output coupled to a load input of said preset counter for instructing said counter to load said digital image signal as said character level signal when said digital image signal is less than the character level signal inputted to said comparator, and instructing said counter to count up when said digital image signal is greater than said inputted character level signal.

* * * * *

UNITED STATES PATENT AND TRADEMARK OFFICE
CERTIFICATE OF CORRECTION

PATENT NO. : 5,166,808
DATED : November 24, 1992
INVENTOR(S) : Toshiyuki Kawata It is certified that error appears in the above-identified patent and that said Letters Patent is hereby corrected as shown below:

Column 1, line 62, after "document" insert a period --.--.

Column 3, line 56, "a" (first occurrence) should be --9--.

Column 5, line 45, delete "25";
       line 60, "$2^n$" should be --$2^m$--;
       line 61, "$2^n$" should be --$2^m$--;
       line 64, "$2^n$" should be --$2^m$--.

Signed and Sealed this

Thirtieth Day of November, 1993

Attest:

*Attesting Officer*

BRUCE LEHMAN

*Commissioner of Patents and Trademarks*